United States Patent [19]

Rohrbach

[11] Patent Number: 4,494,928
[45] Date of Patent: Jan. 22, 1985

[54] METHOD AND APPARATUS FOR PRODUCING EXPANDED CLAY AND EXPANDED SHALE

[75] Inventor: Hans-Joerg Rohrbach, Balingen, Fed. Rep. of Germany

[73] Assignees: Rohrbach Technologie KG; Baustofftechnik GmbH & Co., both of Balingen, Fed. Rep. of Germany

[21] Appl. No.: 515,167

[22] Filed: Jul. 19, 1983

[30] Foreign Application Priority Data

Jul. 31, 1982 [DE] Fed. Rep. of Germany ....... 3228745

[51] Int. Cl.³ .......................... F27B 14/00; F27B 7/36; F27B 7/02; F27B 7/14
[52] U.S. Cl. ...................................... 432/13; 432/105; 432/106; 432/118
[58] Field of Search ................ 432/13, 105, 106, 118; 252/378, 378 P

[56] References Cited

U.S. PATENT DOCUMENTS 2,430,601 11/1947 Cleary ................................... 432/13
4,342,554 8/1982 Rohrbach ............................ 432/205

FOREIGN PATENT DOCUMENTS 1145543 5/1983 Canada .
3017288 11/1981 Fed. Rep. of Germany .

Primary Examiner—John J. Camby
Attorney, Agent, or Firm—Spencer & Frank

[57] ABSTRACT

A method and apparatus for producing expanded clay or expanded shale finished product in a straight-line continuous rotary tube kiln provided with charging and discharge ends at respectively opposite ends of the kiln, the kiln being divided into a preheating zone and an expansion zone following one another in the direction from the charging end to the discharge end, the preheating zone being more proximate to the charging end and the expansion zone being more proximate to the discharge end, a stationary burner disposed in the vicinity of the discharge end and a mantle burner which rotates together with the kiln and which is located to heat the preheating zone. The method includes introducing raw product at the charging end, heating the preheating zone with the mantle burner, passing the raw product from the charging end through the preheating zone heated by the mantle burner so as to dry and heat the raw product, passing the raw product to the expansion zone, and expanding the raw product in the expansion zone under the influence of heat from the stationary burner to create the finished product, wherein the improvement comprises thoroughly mixing the raw product in a region between the mantle burner and the charging end, to creating conditions to assure more complete fuel combustion of fuel at the mantle burner.

7 Claims, 8 Drawing Figures

U.S. Patent  Jan. 22, 1985  Sheet 1 of 2  4,494,928
Fig. 1
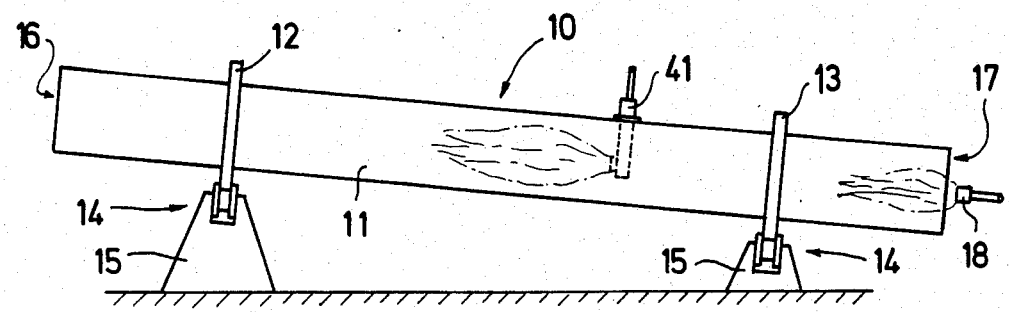
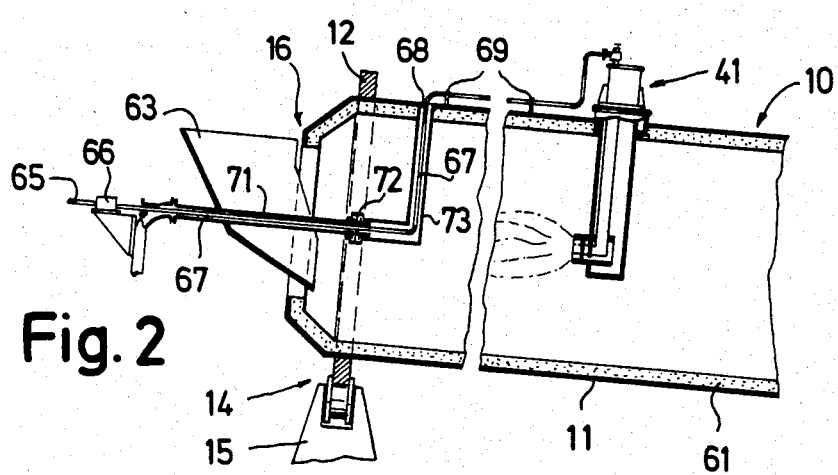
Fig. 2
Fig. 3
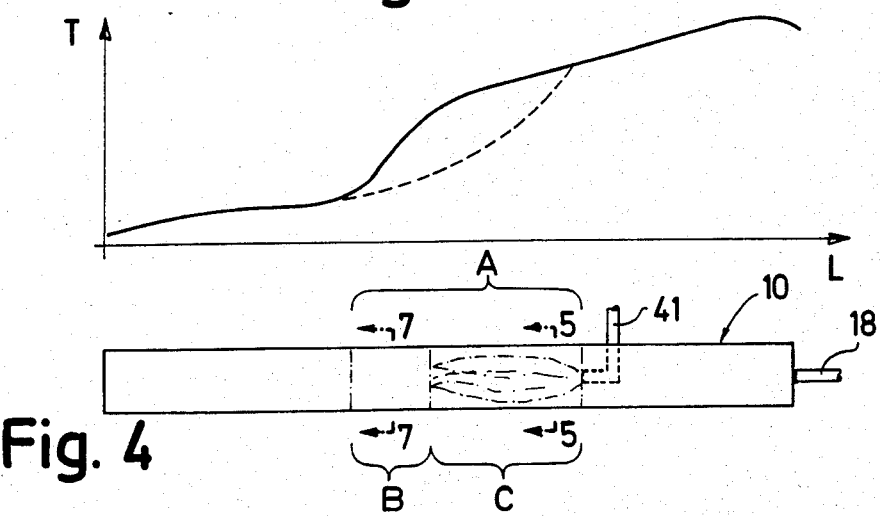
Fig. 4

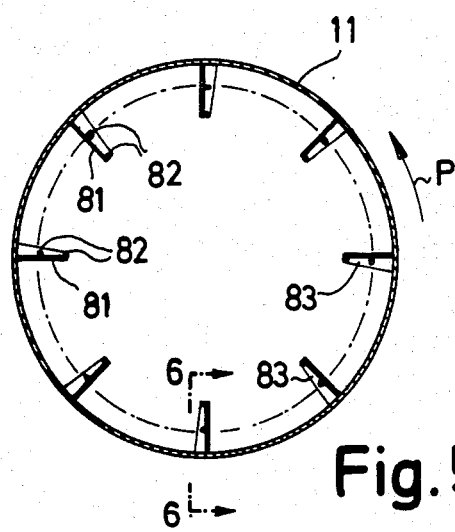
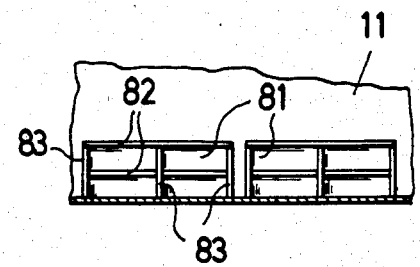
Fig. 6
Fig. 5
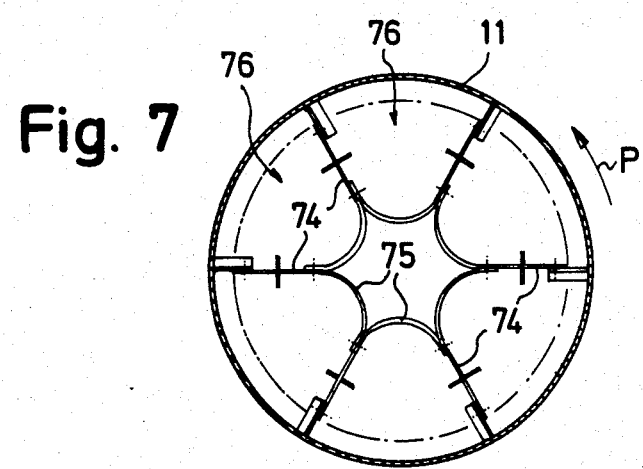
Fig. 7
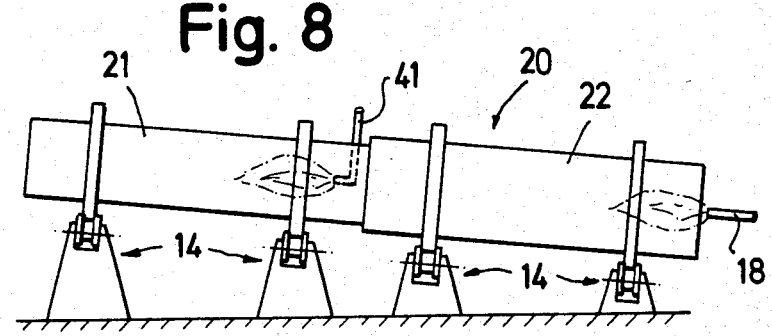
Fig. 8

METHOD AND APPARATUS FOR PRODUCING EXPANDED CLAY AND EXPANDED SHALE

BACKGROUND OF THE INVENTION

The present invention relates to a method and apparatus for producing expanded clay and expanded shale of the type set forth in my U.S. Pat. No. 4,324,554, where a straight-line continuous rotary tubular kiln is provided having charging and discharge ends, a stationary burner disposed in the vicinity of the discharging end and an additional mantle burner which rotates together with the kiln, wherein the raw material introduced at the charging end passes through a preheating zone heated by the mantle burner so as to dry and heat the raw material which is then expanded into the finished product in an expansion zone leading to the discharge end by means of heat generated by the stationary burner.

The present invention furthermore relates to an apparatus for implementing such a method for producing expanded clay and expanded shale in a straight-line rotary kiln of the type described above.

The process and the apparatus according to U.S. Pat. No. 4,342,554 has as one of its objects the saving of heat energy while simultaneously reducing heat requirements and apparatus cost.

SUMMARY OF THE INVENTION

It is an object of the present invention to improve the method and apparatus set forth in U.S. Pat. No. 4,342,554 so that more heat energy can be saved.

This and other objects are accomplished by the present invention in a method and apparatus in which the granular raw material is mixed thoroughly in the region immediately preceding the mantle burner for the purpose of transferring heat more efficiently from the mantle burner to the raw material while permitting more complete fuel combustion at the mantle burner. The apparatus for implementing the method according to the present invention is provided with scooping, or mixing, devices immediately preceding the additional mantle burner which are fastened to the cylinder jacket and are oriented into the interior of the kiln.

BRIEF DESCRIPTION OF THE DRAWINGS

FIG. 1 is a schematic side elevational representation of a rotary tubular kiln having a stationary burner and a rotating mantle burner.

FIG. 2 is a cut-away elevational detail view of the basic structure of a rotary tubular kiln with mantle burner.

FIG. 3 shows a typical temperature curve in a rotary tubular kiln according to FIG. 1.

FIG. 4 is a schematic side elevational representation of a rotary tubular kiln which can be constructed according to the invention and operated to produce the temperature curve of FIG. 3.

FIG. 5 is a cross-sectional view along the line 5—5 of FIG. 4.

FIG. 6 is a cross-sectional view along the line 6—6 of FIG. 5.

FIG. 7 is a cross-sectional view along the line 7—7 of FIG. 6.

FIG. 8 is a schematic representation of a further embodiment of a rotary tubular kiln having a stationary burner and a rotating burner.

DESCRIPTION OF THE PREFERRED EMBODIMENTS

FIG. 1 is a schematic representation of a rotary tubular kiln for the production of expanded clay and/or expanded shale. Expanded clay and shale are known to be used as so-called "light-weight aggregates" in the production of "light-weight concrete." In addition to expanded clay and expanded shale, sintered flue ashes are also used as light-weight aggregates and these can also be produced according to the method of the present invention. Expanded clay in suitable granulate form is also used in hydroponic horticulture, particularly for house plants.

FIG. 1 shows schematically a rotary tubular kiln 10 including an elongate rotary tube 11 having a length of, for example, 30 to 60 m, extending in the direction of its center axis in a linear stage-less configuration. Two bearing rings 12, 13 which rotate on roller stations 14 are fixed at the exterior of the circularly cylindrical rotary tube 11. The roller stations 14 each rest on a foundation support 15. A drive motor (not shown) serves to rotate rotary tube 11 about its center axis. The end of the rotary tube 11 at the left-hand side of FIG. 1 is the charging end 16 into which the raw material to be expanded is introduced. The finished product is removed at the discharge end 17 of the rotary tube 11, at the right-side of FIG. 1. The rotary tube 11 is inclined downwardly with respect to the horizontal in the direction from the charging end 16 to the discharging end 17, so that the product to be treated travels gradually from the charging end 16 to the discharging end 17. At or near the discharging end 17, a stationary burner 18 which is fed with oil, gas or pulverized coal is mounted; the flame of this burner is oriented to project into the rotary tube 11 and furnishes the heat required to preheat the raw product.

An additional mantle burner 41 is provided at the exterior of the rotary tube kiln 11 between charging end 16 and discharging end 17. The mantle burner 41 is fixedly mounted to an outside jacket 61 of rotary tube kiln 11 and rotates together with kiln 11. The mantle burner 41 has its flame exit opening oriented into the interior of the rotary tube kiln in such a manner that its flame extends coaxially with the rotary tube 11 in the direction toward its charging end 16 over a distance which determines the so-called "flame region." The heat generated by the mantle burner 41 serves to dry and preheat the raw product introduced at charging end 16.

FIG. 2 shows the structure and operation of a preferred embodiment of mantle burner 41. One end of the mantle burner 41 is fixedly connected to the jacket 61 of rotary tube 11 and its other end extends radially into the interior of the kiln in such a way that its flame exit opening is located at the center of the kiln cross section and is aligned with the kiln axis. The rotary tube furnace 10 is provided with a charging funnel 63 located at the charging end 16 of rotary tube 11 for the raw material. The fuel, which may be oil, gas or pulverized coal, is supplied to the mantle burner 41 via a fuel line passing through the charging end 16 and the charging funnel 63.

In the embodiment shown in FIG. 2 it is assumed that mantle burner 41 is being fed with oil. A fixed oil line 65 leads to a conventional rotary coupling 66 which joins oil line 65 with a conduit section 67. Conduit section 67 is provided with multiple bends and rotates together with the rotary tubular kiln 10. After one such bend, conduit section 67 extends through an opening 68 in jacket 61 to the outside of the kiln, and after three further bends, section 67 terminates at the burner 41. The conduit section 67 is supported, on the one hand, on the rotary coupling 66 and, on the other hand, by mounting members 69 on the jacket 61. In this way, fuel can be fed to the mantle burner 41 rotating with kiln 10 by way of the conduit section 67.

The conduit section 67 is surrounded in the interior of the rotary tubular kiln 10 by two pipe sections 71 and 73 of a larger diameter than section 67 and which are connected together by a rotary coupling 72. Pipe section 73 behind rotary coupling 72 thus rotates with the rotary tubular kiln 10, while pipe section 71 ahead of the coupling is stationary. Cooling air to cool conduit 67 can be blown in through the pipe section 71 and then through the pipe section 73. Furthermore, a concomitantly rotating primary air fan for mantle burner 41 can also be on the outside of jacket 61 beside mantle burner 41.

Although by drying and preheating the raw material using mantle burner 41, the efficiency of the rotary tube kiln system as a whole will be increased considerably and thus heating energy will be saved, it has been found that the heating energy furnished by mantle burner 41 is not utilized to the optimum degree. This is evident particularly from the fact that the preheating of the raw material, when it passes through the rotary kiln, takes place relatively slowly and, more importantly, the fuel feeding the flame of the jacket burner is not entirely consumed.

It has been found that these drawbacks can be overcome if the raw product is mixed thoroughly in the region immediately preceding burner 41, i.e., in the region of the so-called "preheating zone." In this way, the raw product takes on the desired preheating temperature faster and also some of the heat is imparted to the interior wall of the rotary tube 11 so that the flame of burner 41 as a whole burns hotter. This leads to more complete fuel combustion and thus to maximum utilization of the supplied fuel.

FIG. 3 is a graph which shows the temperature of the raw material as it passes through the rotary kiln 10. The length L of the rotary tube kiln 10 is plotted on the abscissa and the temperature T of the product treated in kiln 10 is plotted on the ordinate. The portion of the curve shown in dashed lines in FIG. 3 represents the temperature of the material in the preheating zone without mixing of the raw material according to the invention. The curve shown in a solid line in FIG. 3 shows the temperature of the material when thoroughly mixed according with the invention in the preheating zone, i.e., immediately ahead of mantle burner 41. The temperature of the product thus rises much faster to the desired value and, as measurements have shown, results in more complete fuel consumption at the mantle burner 41 and thus better fuel utilization.

FIG. 4 shows, in association with the temperature curve of FIG. 3, various regions extending over the length L of the rotary tube kiln 10. The preheating zone A located immediately ahead of mantle burner 41 is subdivided into two partial regions B and C. Region C is coextensive with the so-called mantle burner "flame region," i.e., the region corresponding to the axial length of the flame of mantle burner 41 when mantle burner 41 is in operation. The region to the left of region A in FIG. 4 is a drying zone while the region to the right of region A in FIG. 4 is the expansion zone which is heated by the stationary burner 18.

FIGS. 5 and 6 show a mixing device according to the invention for thoroughly mixing the raw material to be treated in region A and its partial regions B, C. A plurality of bar plates 81 projects radially inwardly from the interior wall of rotary tube 11 in order to produce a scooping effect. As shown in FIG. 6, the bar plates 81 are reinforced by means of longitudinal and transverse ribs 82 and 83, respectively. Each bar plate 81 has an edge fastened to jacket 61 of rotary tubular kiln 10, and the edge opposite the fastened edge projects freely into the interior of the kiln. When tube 11 is rotated in the direction of arrow P shown in FIG. 5, the granular raw material disposed in the tube is scooped up by bar plates 81 and is carried along to the side while being loosened until it drops back to the kiln wall at another location while still being loosened, thus resulting in thorough mixing which provides for more effective operation of the mantle burner 41.

FIG. 7 shows another mixing device for thorough mixing of the product which likewise includes a plurality of radially inwardly projecting bar plates 74. As shown in FIG. 7, bar plates 74, which may or may not be reinforced by ribs as shown in FIG. 6 in connection with bar plates 81, are connected together at their inner edges by curved metal sheets 75 so as to form closed chambers 76 which serve to thoroughly mix the product when the rotary tube 11 rotates. Both bars 81 and 74 are made of a heat resistant metal.

It has been found that particularly favorable results can be obtained with respect to the degree of mixing and thus better fuel consumption of the mantle burner 41 if the scooping or mixing devices of the type shown in FIG. 5 is disposed in region C (FIG. 4) and scooping or mixing devices of the type shown in FIG. 7 are disposed in region B (FIG. 4).

FIG. 8 is a schematic representation of a further embodiment of the rotary tubular kiln in which mixing devices according to FIGS. 5 through 7 may likewise be in locations corresponding to the locations of mixing devices in the embodiment of FIG. 4. The rotary tubular kiln 20, as shown in FIG. 8, comprises two independently rotatably mounted rotary tubes 21, 22 which rotate independently of one another, are oriented coaxially with respect to one another and follow one another in a sealed manner. Rotary tube 21 essentially forms the preheating zone and rotary tube 22 essentially constitutes the expansion zone. The mantle burner 41 which heats the preheating zone is connected with rotary tube 21 so as to be fixed. The arrangement according to FIG. 8 has the advantage that the two rotary tubes 21, 22 can rotate at respectively different speeds of revolution which permits varying the rotation of the two rotary tubes to achieve the desired treatment of the product.

In the region immediately ahead of jacket burner 41, mixing devices of the type shown in FIGS. 5 through 7 may be provided at the inner wall of rotary tube 21 so that the treated product is mixed thoroughly and thus the fuel leaving mantle burner 41 is more completely consumed.

It will be understood that the above description of the present invention is susceptible to various modifications, changes and adaptations, and the same are intended to be comprehended within the meaning and range of equivalents of the appended claims.

What is claimed is:

1. In a method for producing expanded clay or expanded shale finished product in a straight-line continuous rotary tube kiln provided with charging and discharge ends at respectively opposite ends of the kiln, the kiln being divided into a preheating zone and an expansion zone following one another in the direction from the charging end to the discharge end, the preheating zone being more proximate to the charging end and the expansion zone being more proximate to the discharge end, a stationary burner disposed in the vicinity of the discharge end and a mantle burner which rotates together with the kiln and which is located to heat the preheating zone, which method comprises introducing raw product at the charging end, heating the preheating zone with the mantle burner, passing the raw product from the charging end through the preheating zone heated by the mantle burner so as to dry and heat the raw product, passing the raw product to the expansion zone, and expanding the raw product in the expansion zone under the influence of heat from the stationary burner to create the finished product, the improvement wherein said method further comprises the step of thoroughly mixing the raw product in the preheating zone immediately preceding the mantle burner, thereby creating conditions to assure more complete fuel combustion of fuel at the mantle burner.

2. In a rotary tubular kiln for producing expanded clay or expanded shale, which kiln includes a means defining a continuous, essentially linear product conveying and treating region which includes a preheating zone enclosed by a cylindrical jacket, the kiln having charging and discharge ends at respectively opposite ends of said product conveying and treating region, a stationary burner disposed in the vicinity of the discharging end for heating said conveying and treating region, and a mantle burner fixed to said jacket to rotate therewith and located for heating the preheating zone, the improvement comprising means mounted in said kiln for mixing raw material introduced in the kiln via the charging end, said mixing means being located in the preheating zone immediately preceding said mantle burner.

3. An apparatus as defined in claim 2 wherein said mixing means comprises means for scooping raw material, said scooping means being fixed to the interior of said jacket so as to project into said preheating zone.

4. An apparatus as defined in claim 2 wherein said preheating zone includes a mantle burner flame region whose axial extent corresponds to the axial length of the flame of said mantle burner when said mantle burner is in operation, and said mixing means comprises a plurality of bar plates fixed to the interior of said jacket so as to project into said flame region.

5. An apparatus as defined in claim 2 wherein said cylindrical jacket comprises first and second coaxial independently rotating tubes with one end of said first tube corresponding to said charging end of said kiln and one end of said second tube corresponding to said discharge end of said kiln, said mantle burner being positioned in said first tube and said mixing means being located in said preheating zone.

6. An apparatus as defined in claim 4 wherein said preheating zone further includes a partial region located adjacent the end of said flame region which is directed toward said charging end, and said mixing means further comprise a plurality of further bar plates fixed to the interior of said jacket so as to project radially inwardly into said partial region, and a plurality of curved metal sheets connecting together the inward radial ends of said further bar plates to form with said further bar plates closed chambers for thoroughly mixing the raw material.

7. Method as defined in claim 1 wherein the preheating zone includes a mantle burner flame region whose axial extent corresponds to the axial length of the mantle burner flame, and said step of mixing is performed at least in part in the flame region.

* * * * *